United States Patent
Gruson

(10) Patent No.: US 7,173,196 B2
(45) Date of Patent: Feb. 6, 2007

(54) INSTALLATION FOR FILLING RECEPTACLES BY WEIGHT WITH FILLER SPOUTS BEING ENGAGED IN THE RECEPTACLES

(75) Inventor: Bertrand Gruson, Breville sur Mer (FR)

(73) Assignee: Serac Group, La Ferte Bernard (FR)

( * ) Notice: Subject to any disclaimer, the term of this patent is extended or adjusted under 35 U.S.C. 154(b) by 0 days.

(21) Appl. No.: 11/480,395

(22) Filed: Jul. 5, 2006

(65) Prior Publication Data

US 2007/0007047 A1    Jan. 11, 2007

(30) Foreign Application Priority Data

Jul. 6, 2005   (FR) ................... 05 07193

(51) Int. Cl.
 *B65B 1/32* (2006.01)
 *G01G 17/06* (2006.01)
(52) U.S. Cl. .................. 177/116; 177/145; 141/83
(58) Field of Classification Search .............. 177/116, 177/145; 141/83
 See application file for complete search history.

(56) References Cited

U.S. PATENT DOCUMENTS 5,835,982 A * 11/1998 Lanaro et al. ............. 177/145
6,119,475 A * 9/2000 Murray et al. ............. 62/292
6,134,896 A * 10/2000 Brown et al. .............. 62/149
6,457,496 B1 10/2002 Chuang et al.
6,627,826 B2 * 9/2003 Cavina et al. ............. 177/145
6,655,421 B2 * 12/2003 Kohashi et al. ............ 141/83
7,017,625 B2 * 3/2006 Amano et al. ............. 141/83
7,045,721 B1 * 5/2006 Green et al. ............... 177/146
2004/0025962 A1 * 2/2004 De Antoni Migliorati et al.

FOREIGN PATENT DOCUMENTS

EP    0 311 229 A2    4/1989
EP    1 514 834 A1    3/2005
WO    WO-02/098785 A1   12/2002

* cited by examiner

*Primary Examiner*—Randy W. Gibson
(74) *Attorney, Agent, or Firm*—Birch, Stewart, Kolasch and Birch, LLP

(57) ABSTRACT

An installation for filling receptacles by weight, the installation comprising a platform having secured thereto at least one filler spout and a weighing device which is vertically below the filler spout and which comprises a receptacle support member associated with a weighing member. The installation is distinguished in that the weighing device includes a link member between the support member and the weighing member, the link member enabling the support member to be moved relative to the weighing member between a high position in which the filler spout is engaged in the receptacle, and a low position in which the filler spout is disengaged from the receptacle, and in that the weighing device includes a locking member for locking the link member with the support member in its high position.

6 Claims, 3 Drawing Sheets

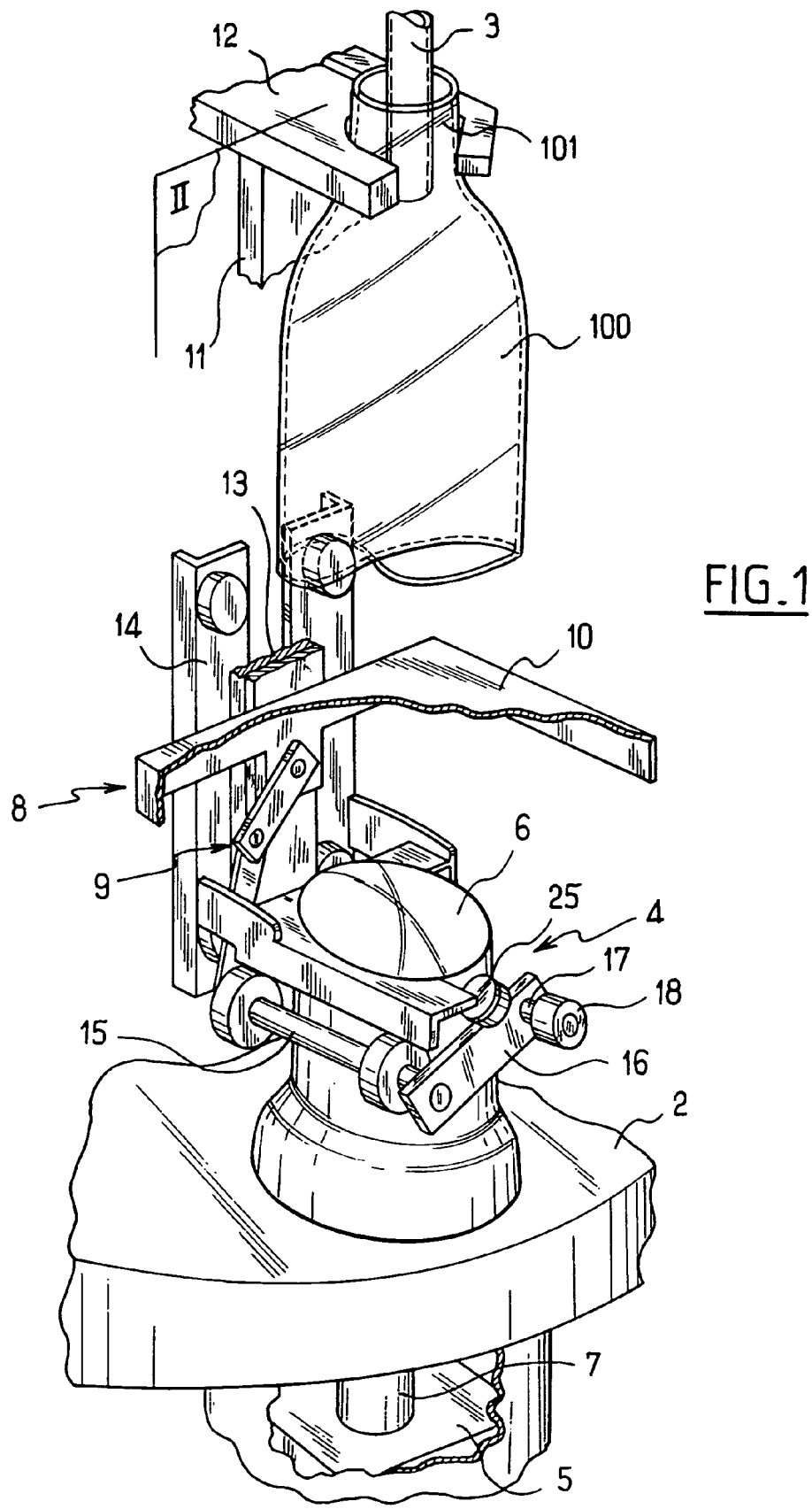
FIG_1

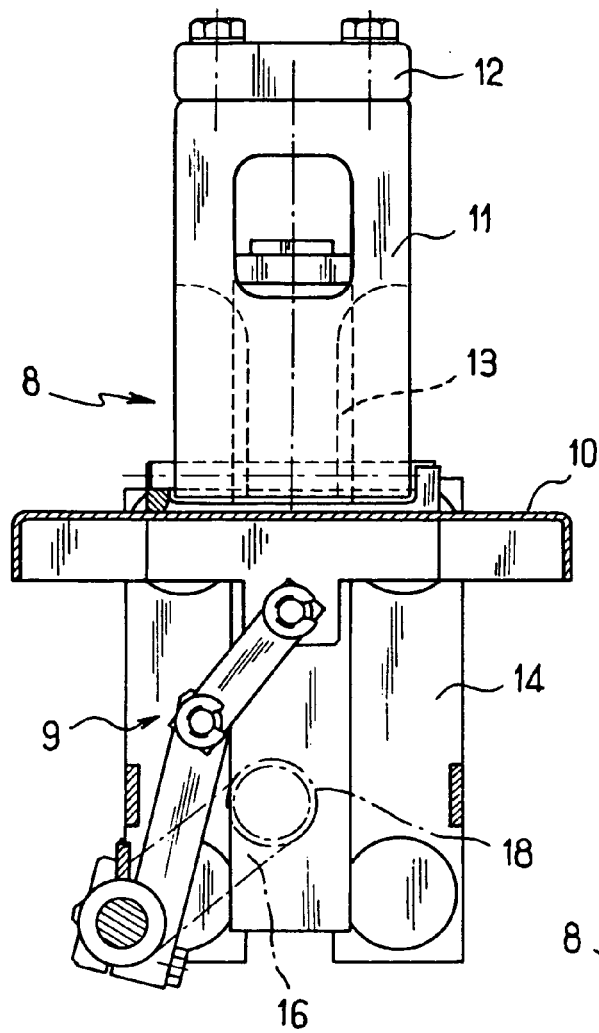
FIG_2
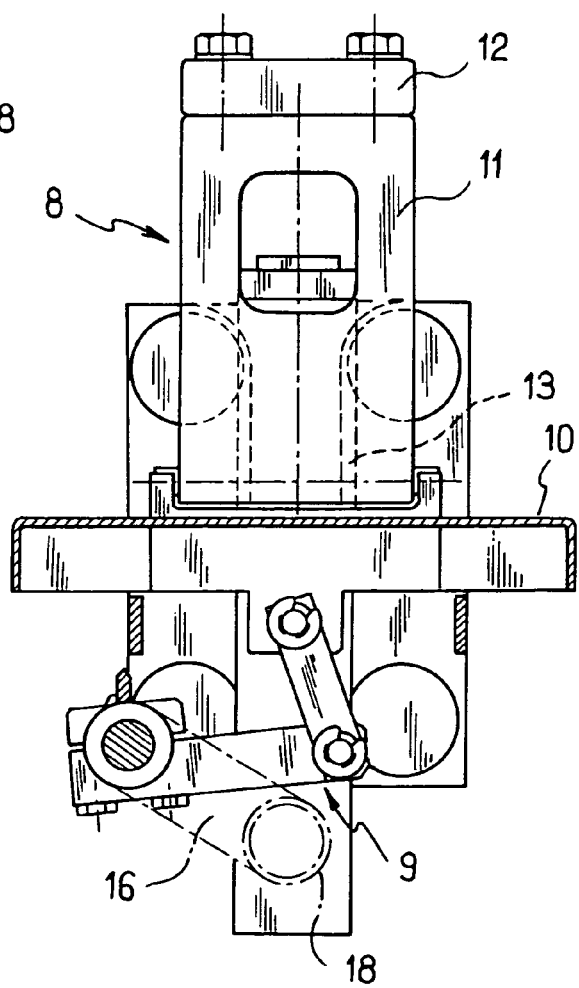
FIG_3

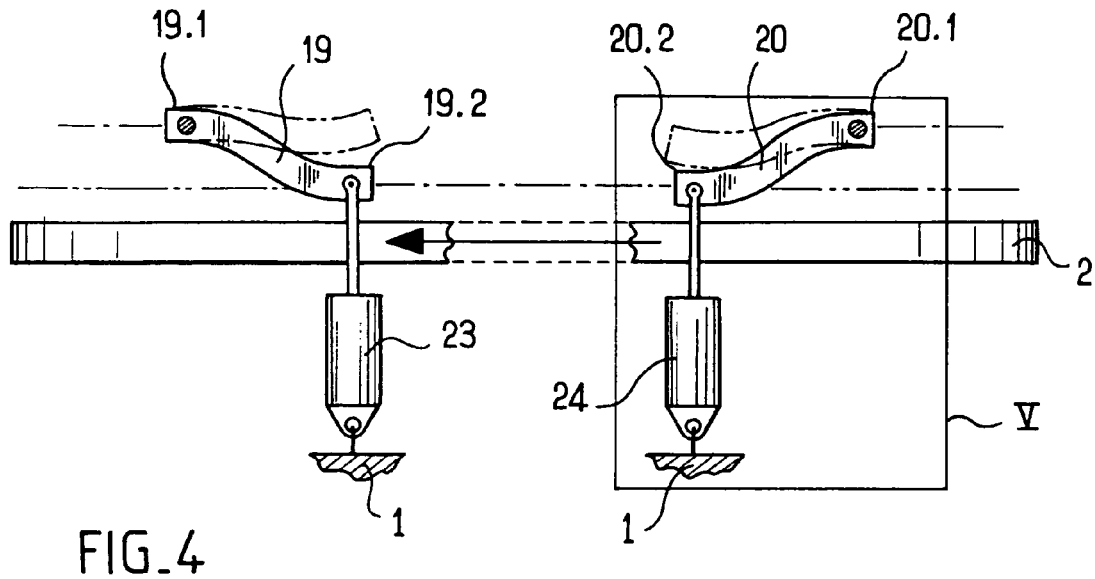
FIG_4
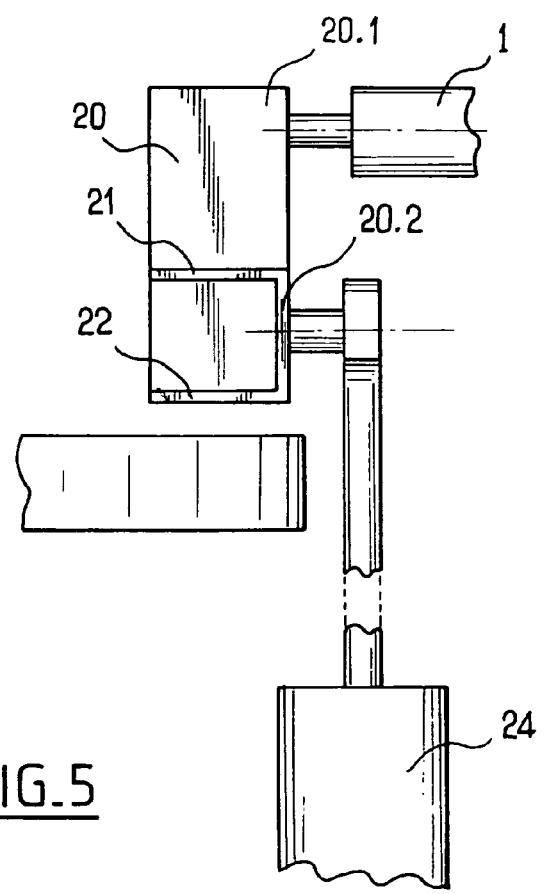
FIG_5

INSTALLATION FOR FILLING RECEPTACLES BY WEIGHT WITH FILLER SPOUTS BEING ENGAGED IN THE RECEPTACLES

The present invention relates to an installation for filling receptacles by weight, and intended more particularly for filling them with substances that are viscous.

BACKGROUND OF THE INVENTION

A filler installation generally comprises a stationary structure having a platform pivotally mounted thereon and carrying both filler spouts and receptacle supports vertically beneath the filler spouts. While a receptacle is being filled with a viscous substance, when the viscous substance starts to flow, an accumulation of substance in the form of a bulb tends to form at the outlet of the filler spout, the bulb presenting transverse dimensions that are often greater than those of the neck of the receptacle. There is thus a risk of the substance flowing over the outside the receptacle.

To remedy that drawback, installations for filling by volume are known in which the support members are movable relative to the filler spout between a high position for filling in which the filler spouts are engaged in the receptacles, and a low position for on-loading and off-loading the receptacles, in which the filler spouts are disengaged from the receptacles. The support members are moved between the high and low positions and they are held in said positions by a cam that is secured to the stationary structure.

Nevertheless, that solution is not suitable in installations for filling by weight in which the support members form parts of weighing devices and are connected to weighing members. The support members must transfer to the weighing member the forces that are exerted on them by the receptacles while they are being filled. In order to perform this function, the support members must not be locked in position as in installations for filling by volume, where it is the cam that supports the force exerted on the support member by the receptacle.

OBJECT OF THE INVENTION

It would therefore be advantageous to have an installation for filling by weight that enables filler spouts to be engaged in the receptacles that are to be filled.

BRIEF SUMMARY OF THE INVENTION

To this end, the invention provides an installation for filling receptacles by weight, the installation comprising a platform having secured thereto at least one filler spout and a weighing device which is vertically below the filler spout and which comprises a receptacle support member associated with a weighing member. The installation is distinguished in that the weighing device includes a link member between the support member and the weighing member, the link member enabling the support member to be moved relative to the weighing member between a high position in which the filler spout is engaged in the receptacle, and a low position in which the filler spout is disengaged from the receptacle, and in that the weighing device includes a locking member for locking the link member with the support member in its high position.

Thus, the support member is movable relative to the weighing member and thus relative to the filler spout, and by locking the link member, the locking member serves to establish a rigid connection between the support member and the weighing member so that the weighing member is subjected to the weight of the receptacle carried by the support member.

Advantageously, the link member is arranged to form a toggle link between the weighing member and the support member.

The link member then provides its own locking and thus possesses a structure that is particularly simple.

Preferably, for the platform mounted to pivot on a stationary structure, the link member comprises a toggle linkage having a first end connected to the weighing member and a second end connected to the support member, the first end being secured to a shaft provided with a crank pin for co-operating with stationary cams arranged to cause the crank pin to tilt between first and second positions corresponding respectively to the high and low positions of the support member.

As a result, the displacement of the support member is controlled in a manner that is simple and reliable.

In which case, and advantageously, the cam causing the crank pin to move from its first position towards its second position comprises a top guide surface and a bottom guide surface that are substantially parallel to each other for receiving between them the crank pin, the top surface being arranged to start the tilting of the crank pin towards its second position, and the bottom surface being arranged to slow down the crank pin progressively in the vicinity of its second position.

This prevents the support member dropping suddenly towards its low position, which could give rise to splashing.

Also advantageously, the cams are movable between an active position in which they lie on the path of the crank pin, and an inactive position in which the cams are disengaged from the path of the crank pin.

The installation can thus be used without the support member moving vertically in order to fill receptacles with substances that do not require the filler spout to be engaged in the neck. Furthermore, this makes it possible to avoid loading a receptacle having a badly-shaped neck that would not enable the filler spout to be engaged therein.

Other characteristics and advantages of the invention appear on reading the following description of a particular, non-limiting embodiment of the invention.

BRIEF DESCRIPTION OF THE DRAWINGS

Reference is made to the accompanying drawings, in which:

FIG. 1 is a fragmentary perspective view of an installation in accordance with the invention, the support member being in the high position;

FIG. 2 is a section view of said installation on plane II of FIG. 1;

FIG. 3 is a view analogous to that of FIG. 2, with the support member being in the low position;

FIG. 4 is a fragmentary elevation view of the installation; and

FIG. 5 is a face view of a portion of the installation appearing in the zone marked V in FIG. 4.

DETAILED DESCRIPTION OF THE INVENTION

With reference to FIG. 1, the installation in accordance with the invention is for filling receptacles 100 each having a neck 101.

With reference also to FIGS. 2 to 5, the installation comprises a stationary structure 1 having a platform 2 pivotally mounted thereon in conventional manner.

The platform 2 is provided with filler spouts 3 (only one being visible in FIG. 1) connected to a tank of substance for filling (not shown in the figures). Each filler spout 3 incorporates in conventional manner a valve actuated, by means that are not shown, between a flow position and a position in which flow through the filler spout is stopped.

A weighing device given overall reference 4 is mounted on the platform 2 vertically beneath each filler spout 3 and is connected to the valve actuator means in order to enable actuation of the valve to be controlled as a function of the weight detected by the weighing device 4.

The weighing device comprises a unit, in this example secured under the platform 2, and supporting a weighing member referenced 5, against which a bell 6 bears via a vertical rod 7. A support member 8 is connected to the bell 6 by a link member 9. The support member 8 comprises a tray 10 having a bracket 11 removably secured thereon, with a top portion 12 formed by a clamp for clamping the neck of a receptacle standing on the tray 10. The support member 8 is secured to a slider 13 received to slide vertically in a vertical slideway 14 and secured to the bell 6.

The link member 9 comprises a toggle linkage made up of two links that are hinged to each other. The linkage has a first end secured to a horizontal shaft 15 pivotally mounted on the bell 6 and provided at one end with an arm 16 having a free end provided with a crank pin 17 rotatably receiving a wheel 18, and the toggle linkage has a second end hinged to the slider 13.

As a result, the support member 8 is movable between a low position (shown in FIG. 3) in which the tray 10 rests on the bell 6 and the filler spout 3 is disengaged from the neck 101 of the receptacle 100, and a high position (shown in FIGS. 1 and 2) in which the tray 10 is spaced apart from the bell 6 and the filler spout 3 is engaged in the neck 101 of the receptacle 100. The high and low positions of the support member 8 correspond to positions of the toggle linkage that are situated on either side of the position in which its links are in alignment, such that when the support member 8 is in its high position, since the toggle of the link member 9 has gone past the position in which the links are in alignment, it is in an overcenter state and the arm 14 presses against an abutment 25 secured to the bell 6.

The installation includes a cam 19 for raising the support member 8 into the high position, and a cam 20 for lowering the support member 8 into the low position. The cams 19 and 20 are secured to the structure 1 at the periphery of the platform 2 on the path followed by the wheels 18 when the platform is turning (see FIG. 4) so as to move the wheels 18 and cause the crank pins 17 to move between a first position (shown in FIGS. 1 and 2) and a second position (shown in FIG. 3) corresponding respectively to the high and low positions of the support member 8.

With reference more particularly to FIG. 5, the lowering cam 20 is formed by a channel-section bar and has a top guide surface 21 and a bottom guide surface 22 that are substantially parallel to each other for receiving the wheels 18 between them. The top guide surface 21 is arranged to cause the crank pin 17 to begin moving towards its second position, and the bottom guide surface is arranged to slow down the crank pin 17 progressively so as to bring it into its second position.

The cams 19 and 20 have top ends 19.1 and 20.1 hinged to the structure 1, and bottom ends 19.2 and 20.2 connected to the structure 1 via respective actuators 23, 24, so as to be movable between an active position (drawn in continuous lines in FIG. 4) in which the cams 19 and 20 lie on the path followed by the wheels 18, and an inactive position (drawn in chain-dotted line with pairs of dots in FIG. 4) in which the cams 19 and 20 are disengaged from the path followed by the wheels 18.

The operation of the installation is described below with reference to only one of the filler stations of the platform 2.

With the platform 2 in rotation and the support member 8 in its low position, a receptacle 100 is loaded onto the support member 8 when it is located between the two bottom ends 19.2 and 20.2 of the cams 19 and 20.

A conventional detector (not shown in the figures) has already detected that the shape of the receptacle 100 is appropriate, and the raising cam 19 is maintained in its active position in order to cause the support member 8 to rise into its high position (the path of the wheel 18 is shown as a chain-dotted line with single dots in FIG. 4). The filler spout 3 is thus engaged in the neck 101 and filling can begin (valve controlled to take up its flow position). The toggle of the link member 9 is in its overcenter position and establishes a rigid connection between the support member 8 and the weighing member 5. When the weight of the receptacle 100 as detected by the weighing member 5 reaches a predetermined value, filling is stopped (the valve is controlled to take up its flow-stopping position). The wheel 18 encounters the top guide surface 21 and then the bottom guide surface 22 which brings the support member 8 into its low position so as to allow the filled receptacle to be off-loaded.

When the detector detects a receptacle of the wrong shape, the raising cam 19 is caused to take up its inactive position so as to allow the wheel 18 of the support member 8 carrying the receptacle to go past, the support member 8 then remaining in its low position (path for the wheel 18 represented by a chain-dotted line having pairs of dots in FIG. 4). The receptacle is consequently not filled, and the lowering cam 21 is controlled so as to be retracted away from the path followed by the wheel 18.

Naturally, the invention is not restricted to the embodiment described and variants could be applied thereto without going beyond the ambit of the invention as defined by the claims.

In particular, the link member could have a structure that is different, e.g. comprising a bushing with a helical groove with a flat terminal portion and for receiving a stud secured to the support member, or an actuator extending between the weighing member and the support member.

The actuator 24 could be replaced by a mere resilient return member for urging the lowering cam 21 into its active position.

The installation could have some other number of filling stations, for example a single station mounted on a stationary platform.

What is claimed is:

1. An installation for filling receptacles by weight, the installation comprising a platform having secured thereto at least one filler spout and a weighing device which is vertically below the filler spout and which comprises a receptacle support member associated with a weighing member, wherein the weighing device includes a link member between the support member and the weighing member, the link member enabling the support member to be moved relative to the weighing member between a high position in which the filler spout is engaged in the receptacle, and a low position in which the filler spout is disengaged from the receptacle, and wherein the weighing device includes a locking member for locking the link member with the support member in its high position.

2. An installation according to claim 1, wherein the link member is arranged to form a toggle link between the weighing member and the support member.

3. An installation according to claim 1, wherein, for the platform mounted to pivot on a stationary structure, the link member comprises a toggle linkage having a first end connected to the weighing member and a second end connected to the support member, the first end being secured to a shaft provided with a crank pin for co-operating with stationary cams arranged to cause the crank pin to tilt between first and second positions corresponding respectively to the high and low positions of the support member.

4. An installation according to claim 3, wherein the cam causing the crank pin to move from its first position towards its second position comprises a top guide surface and a bottom guide surface that are substantially parallel to each other for receiving between them the crank pin, the top surface being arranged to start the tilting of the crank pin towards its second position, and the bottom surface being arranged to slow down the crank pin progressively in the vicinity of its second position.

5. An installation according to claim 3, wherein the cams are movable between an active position in which they lie on the path of the crank pin, and an inactive position in which the cams are disengaged from the path of the crank pin.

6. An installation according to claim 5, including at least one member for moving into its inactive position the cam for bringing the crank pin from its second position to its first position.

* * * * *